US008713458B2

(12) United States Patent
Mattila et al.

(10) Patent No.: US 8,713,458 B2
(45) Date of Patent: Apr. 29, 2014

(54) VISUALIZATION OF INFORMATION ASSOCIATED WITH APPLICATIONS IN USER INTERFACES

(75) Inventors: Jouka Mattila, Tampere (FI); Erika Reponen, Tampere (FI)

(73) Assignee: Nokia Corporation, Espoo (FI)

( * ) Notice: Subject to any disclaimer, the term of this patent is extended or adjusted under 35 U.S.C. 154(b) by 1883 days.

(21) Appl. No.: 11/706,779

(22) Filed: Feb. 15, 2007

(65) Prior Publication Data

US 2008/0201649 A1 Aug. 21, 2008

(51) Int. Cl.
*G06F 3/048* (2013.01)
*G06F 3/00* (2006.01)

(52) U.S. Cl.
USPC ............ 715/763; 715/836; 715/835; 715/700

(58) Field of Classification Search
USPC ............................ 715/835, 763, 700, 852, 836
See application file for complete search history.

(56) References Cited

U.S. PATENT DOCUMENTS

| | | | |
|---|---|---|---|
| 5,079,723 A | 1/1992 | Herceg et al. ................. 395/156 |
| 5,528,735 A * | 6/1996 | Strasnick et al. ............ 345/427 |
| 5,739,819 A | 4/1998 | Bar-Nahum ................. 345/426 |
| 5,835,091 A | 11/1998 | Bailey et al. ................... 345/345 |
| 5,940,078 A * | 8/1999 | Nagarajayya et al. ........ 715/859 |
| 6,020,828 A | 2/2000 | Gotou ...................... 340/825.44 |
| 6,417,874 B2 | 7/2002 | Bodnar ......................... 345/854 |
| 6,609,023 B1 * | 8/2003 | Fischell et al. ................ 600/515 |
| 6,686,931 B1 | 2/2004 | Bodnar ......................... 345/741 |
| 6,690,402 B1 * | 2/2004 | Waller et al. .................. 715/850 |
| 6,763,496 B1 | 7/2004 | Hennings et al. ........... 715/501.1 |
| 6,793,142 B2 | 9/2004 | Yap ................................. 235/492 |
| 6,917,373 B2 | 7/2005 | Vong et al. ..................... 345/840 |
| 6,957,397 B1 | 10/2005 | Hawkins et al. ............... 715/856 |
| 6,985,145 B2 | 1/2006 | Knighton et al. ............. 345/428 |
| 6,990,534 B2 | 1/2006 | Mikhailov et al. ............ 709/250 |
| 2001/0000668 A1 | 5/2001 | Bodnar ......................... 345/339 |
| 2002/0085045 A1 | 7/2002 | Vong et al. ..................... 345/840 |
| 2003/0064757 A1 | 4/2003 | Yamadera et al. ............. 455/566 |
| 2003/0144868 A1 | 7/2003 | MacIntyre et al. ............... 705/1 |
| 2004/0119756 A1 | 6/2004 | Kumhyr et al. ............... 345/837 |
| 2004/0155909 A1 | 8/2004 | Wagner ......................... 345/854 |
| 2004/0237050 A1 | 11/2004 | Anderson ...................... 715/764 |
| 2005/0091578 A1 * | 4/2005 | Madan et al. .................. 715/512 |
| 2005/0120306 A1 | 6/2005 | Klassen et al. ................ 715/765 |
| 2005/0210399 A1 | 9/2005 | Filner et al. ................... 715/767 |
| 2005/0225559 A1 | 10/2005 | Robertson et al. ............ 345/581 |
| 2005/0235226 A1 | 10/2005 | Watanabe et al. ............. 715/835 |

(Continued)

FOREIGN PATENT DOCUMENTS

| | | |
|---|---|---|
| CN | 1609800 A | 4/2005 |
| EP | 0 369 961 A2 | 5/1990 |

(Continued)

*Primary Examiner* — Andrea Leggett
(74) *Attorney, Agent, or Firm* — Harrington & Smith

(57) ABSTRACT

Methods, computer program products and apparatus are provided that enable a user interface or user interface element (e.g., an icon) to communicate additional contextual information for an associated application or file through attributes of the user interface or user interface element. For example, a simulated shadow of an icon or a simulated image projected on an icon can communicate contextual information for the application or file corresponding to the icon. One exemplary method includes: displaying an icon associated with an application or file; and displaying in association with the icon a simulated shadow having contextual information associated with the application or file.

33 Claims, 12 Drawing Sheets

(56) References Cited

U.S. PATENT DOCUMENTS

| | | |
|---|---|---|
| 2006/0010395 A1 | 1/2006 | Aaltonen ................. 715/779 |
| 2006/0084450 A1 | 4/2006 | Dam Nielsen et al. ....... 455/466 |
| 2006/0156228 A1* | 7/2006 | Gallo et al. ............... 715/523 |
| 2007/0060206 A1 | 3/2007 | Dam Nielsen et al. ....... 455/566 |

FOREIGN PATENT DOCUMENTS

| | | |
|---|---|---|
| EP | 0480859 A2 | 4/1992 |
| EP | 0895154 A2 | 2/1999 |
| JP | H-04257919 A | 9/1992 |
| JP | H-09101874 A | 4/1997 |
| JP | H-1153236 A | 2/1999 |
| JP | 2004021522 A | 1/2004 |
| JP | 2006113637 A | 4/2006 |
| WO | WO 02/089010 A1 | 11/2002 |
| WO | WO-2004/013776 A2 | 7/2005 |
| WO | WO-2005/062590 A1 | 7/2005 |

\* cited by examiner

FIG. 7A
FIG. 7B
FIG. 7C
FIG. 7D
FIG. 7E
FIG. 7F
FIG. 7G
FIG. 8A
FIG. 8B
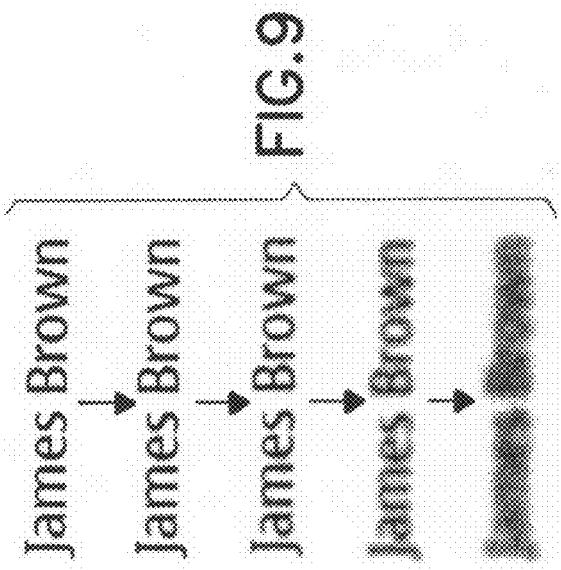
FIG. 9

VISUALIZATION OF INFORMATION ASSOCIATED WITH APPLICATIONS IN USER INTERFACES

TECHNICAL FIELD

This invention relates generally to user interfaces and, more specifically, relates to display of user elements and associated information on the user interfaces.

BACKGROUND

A user interface (UI) can include various elements that enable a user to interact with the UI in different manners. Non-limiting examples of such interactive UI elements include icons, scroll bars and notifications (e.g., pop-up windows). An icon in a UI may provide access to a corresponding application. Icons may also be displayed in response to an email or text message being received from a specific sender, for example. Informative text (such as "1 message received") may also be added near the icon. See U.S. Publication No. 2006/0084450. Also, on an idle screen of a mobile device (such as a cellular phone), there may be indication icons for received messages, missed calls, and calendar events.

BRIEF SUMMARY

In an exemplary aspect of the invention, a method includes: displaying an icon associated with an application or file; and displaying in association with the icon a simulated shadow having contextual information associated with the application or file.

In another exemplary aspect of the invention, a computer program product includes program instructions embodied on a tangible computer-readable medium. Execution of the program instructions results in operations including: displaying an icon associated with an application or file; and displaying in association with the icon a simulated shadow having contextual information associated with the application or file.

In a further exemplary aspect of the invention, an electronic device includes: a display device; and a data processor coupled to the display device, wherein the data processor is configured to: display, on the display device, an icon associated with an application or file; and display, on the display device, in association with the icon a simulated shadow having contextual information associated with the application or file.

In another exemplary aspect of the invention, a method includes: displaying a user interface element associated with an application or file; and projecting a simulated image onto the user interface element, wherein the projected simulated image includes contextual information associated with the application or file.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 7, including FIGS. 7A-7G, and FIG. 8, including FIGS. 8A and 8B, show various embodiments for providing context visualization associated with an icon;

FIG. 9 shows an example of modification of a shadow to provide multiple context visualizations;

DETAILED DESCRIPTION OF EXEMPLARY EMBODIMENTS

One problem is that the above-identified indications just describe application status (such as received messages) next to an icon and there is little or no differentiation regarding context such as who is the sender or what is the importance of the event. Thus, the context could be improved for applications associated with interface elements. A second problem is that these indications are made with two-dimensional graphics, which means that some of the benefits of a three-dimensional user interface in a device are going unused.

It would therefore be desirable to provide techniques that improve upon current techniques for providing context associated with applications to users through a user interface.

Exemplary embodiments of this invention concern three-dimensional (3D) user interfaces, 3D rendering of a user interface, and context and associated metadata indication in the user interface. The exemplary embodiments can be used to add value to user interfaces, such as those used in 3D graphic accelerated systems. Aspects of the invention also describe how shading maps, lighting, and shading algorithms can be used in new, creative ways to communicate information.

Electronic devices and particularly mobile devices will likely include 3D-accelerated interface elements, such as icons, within the next few years. This coming change allows one to indicate (i.e., communicate) various user interface level elements, such as context awareness and application state indications with 3D technology.

Keeping in mind a strategy of end user capabilities, i.e., customization, expression, and potential variations of 3D user interface technology, the problems discussed above can be solved. Such solutions offer better user interfaces for users of electronic devices such as mobile devices.

Figure 1:
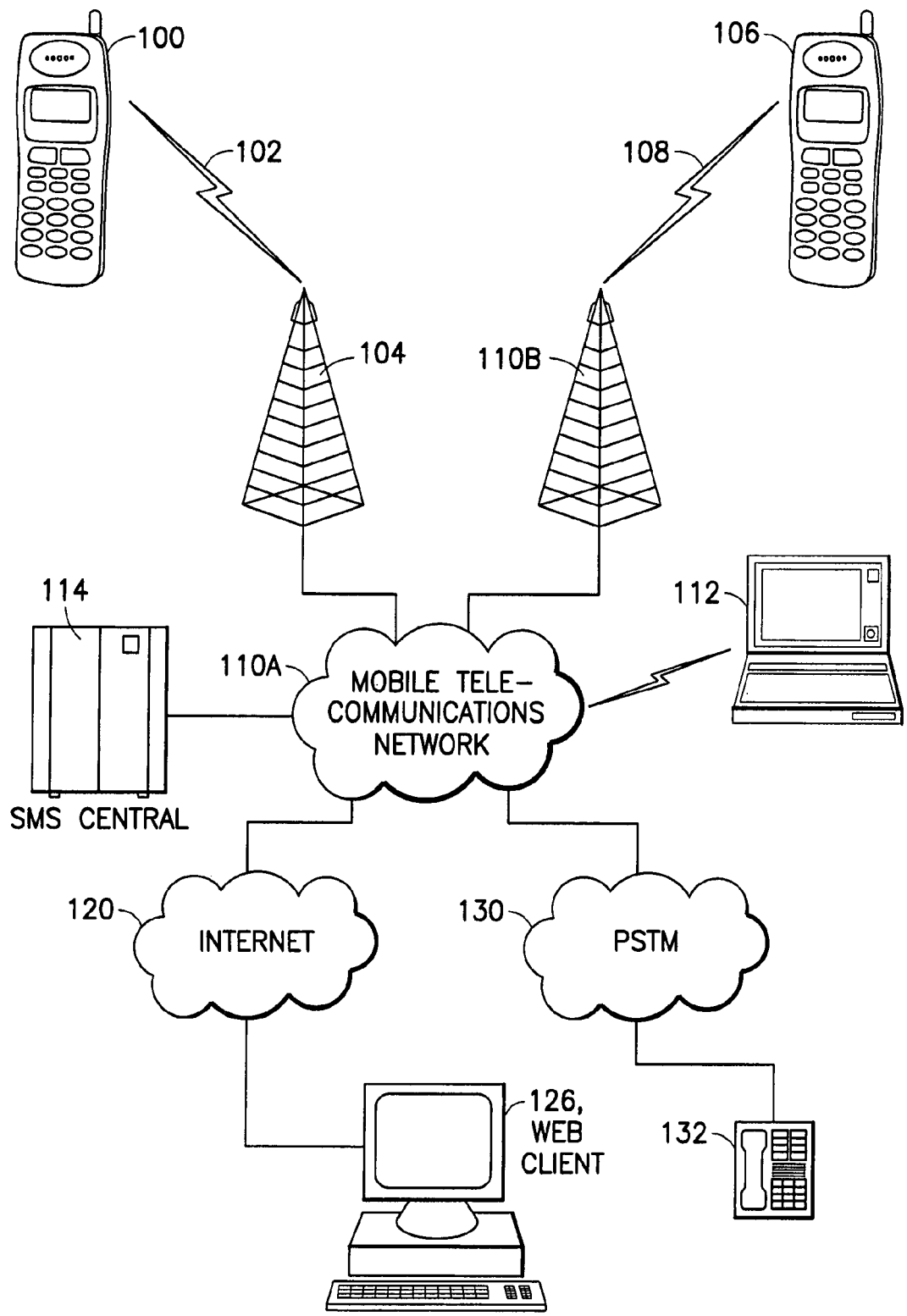
FIG. 1 shows a diagram of an exemplary system in which devices described herein may be used.

First, with reference to FIG. 1, one example of a telecommunication system in which the invention may be applied will be briefly described. Then, with reference to the other figures some exemplary embodiments of the invention will be described in more detail.

In the telecommunication system of FIG. 1, various telecommunications services such as voice calls, data calls, facsimile transmissions, music transmissions, still image transmissions, video transmissions, electronic message transmissions and electronic commerce, as non-limiting examples, may be performed between different mobile devices 100, 106 and/or between web client 126 and other electronic devices (such as laptop computer 112). Among these services, electronic message transmissions are of particular importance for the present invention. For instance, SMS (short message service) messages or email messages may be used.

The mobile devices 100, 106 are connected to a mobile telecommunications network 110A through RF links 102 and 108 via respective base stations 104, 110B. The mobile telecommunications network 110A may be any commercially available mobile telecommunications system, such as global system for mobile communications (GSM), universal mobile telecommunications system (UMTS), or code division multiple access (CDMA) 2000, as non-limiting examples. The mobile devices 100, 106 are illustrated as mobile (cellular) telephones but may alternatively be other kinds of portable devices, including, as non-limiting examples, portable digital assistants (PDAs), communicators, palmtop computers or laptop computers, as is represented by 112 in FIG. 1.

A public switched telephone network (PSTN) 130 is connected to the mobile telecommunications network 110A in a familiar manner. Various telephone devices 132 are connected to the PSTN 130.

The mobile telecommunications network 110A is operatively connected to a wide area network 120, which may be the Internet or a portion or component thereof. A client computer 126 is connected to the wide area network 120.

The mobile telecommunications network 110A has an SMS central 114 in a well known manner. Users of the mobile devices 100, 106 may receive SMS and other (e.g., e-mail) messages from the SMS central 114 over the radio links 102, 108 and, of course, also send outgoing SMS messages to the SMS central 114 and other messages to the web client 126 or laptop 112.

Exemplary embodiments of the disclosed invention may be performed in any of the mobile devices 100, 106, the laptop 112, web client 126, or any other electronic device that utilizes a user interface.

Exemplary embodiments herein describe how context and associated metadata information can be visualized in, e.g., a mobile device that has a 3D user interface. This includes providing visualizations of notifications that the mobile device has, such as time, incoming calls, missed calls, voicemail, received messages, and malfunctions, as non-limiting examples. Utilizing the exemplary embodiments of the invention, one can create and employ new kinds of 3D user interfaces that could increase end user customization capabilities and offer ways designers could create better products. The exemplary methods that this invention covers include projections and shadows that are used in novel and intuitive ways.

Figure 2A:
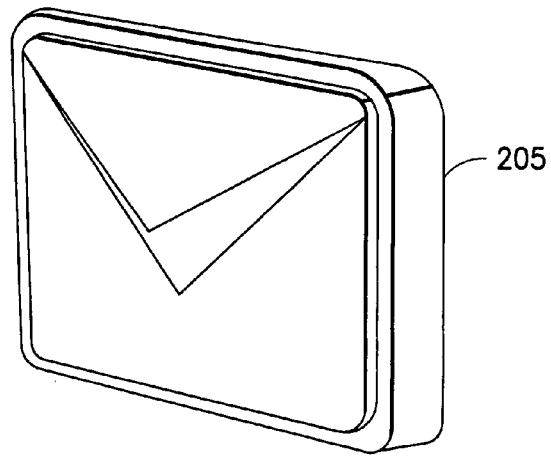
FIG. 2A shows a conventional icon that is typically used for a messaging application.
Figure 2B:
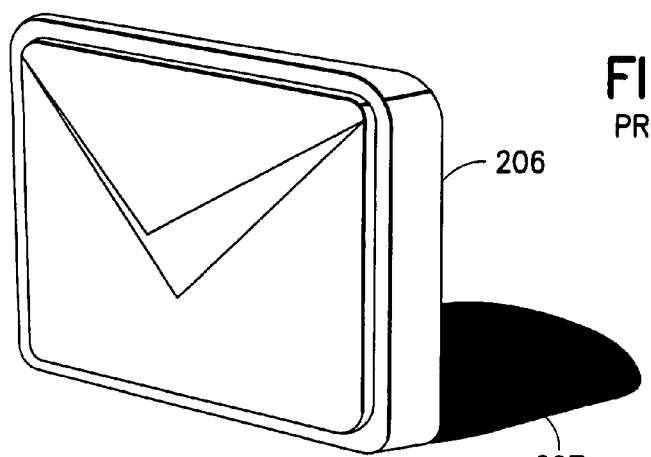
FIG. 2B shows another conventional icon with a shadow that is typically used for a messaging application.
Figure 2C:
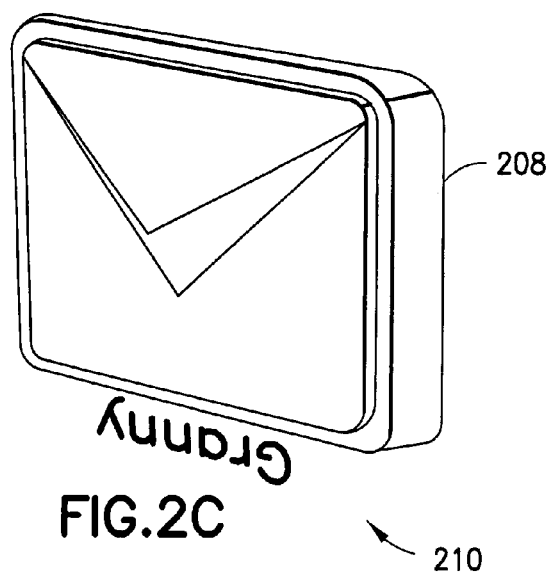
FIG. 2C shows an exemplary icon with a shadow providing context visualization herein in an exemplary embodiment (e.g., for a messaging application)
Figure 3:
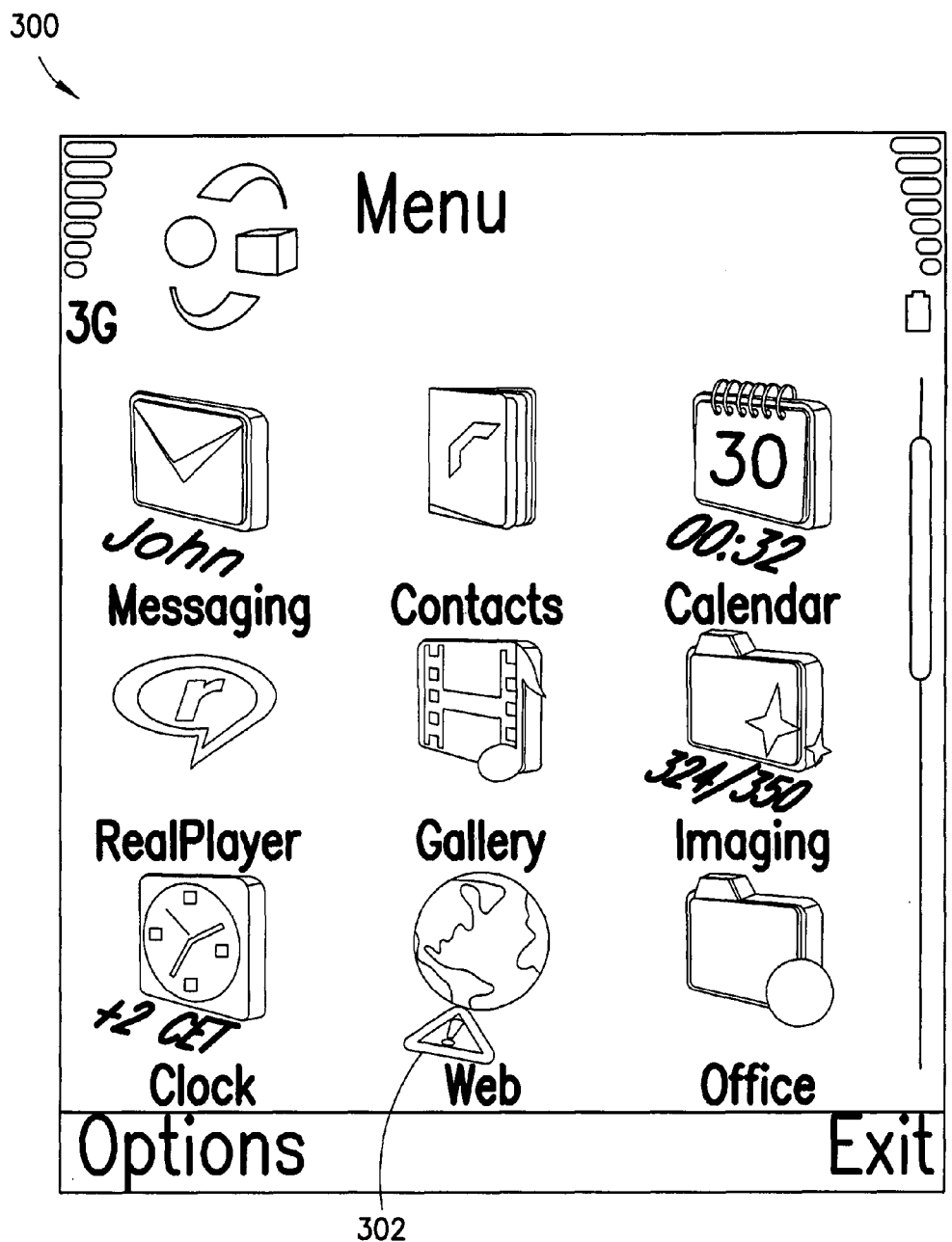
FIG. 3 is an exemplary user interface showing a number of interface elements, some of which have corresponding shadows providing context visualization.
Figure 4:
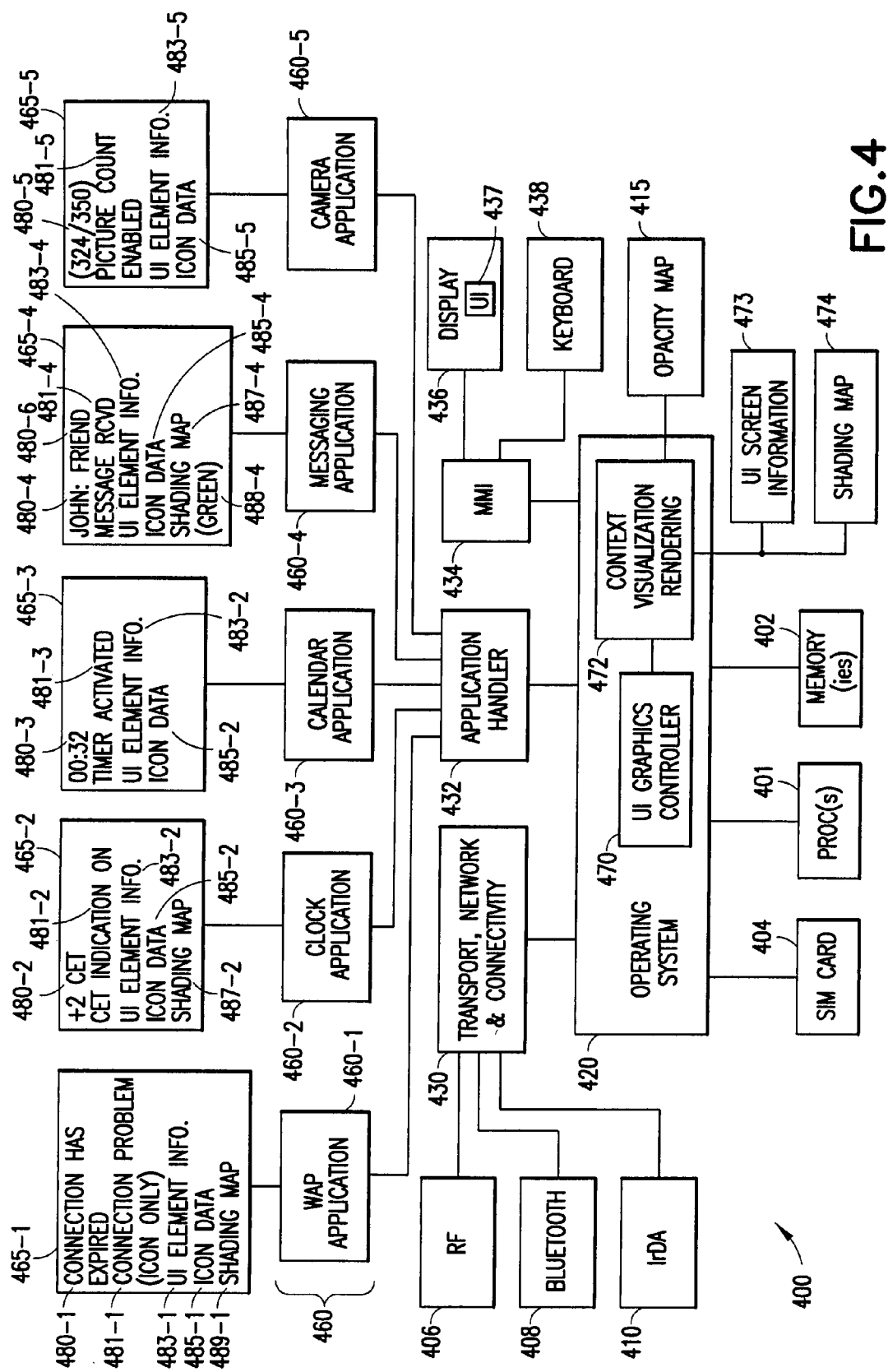
FIG. 4 is a block diagram of an exemplary mobile device suitable for presenting user interfaces described herein.

Aspects of the invention are divided herein into two main exemplary aspects. FIGS. 2A-5 and 7-12 are primarily related to using shadows for context visualizations, where the shadows typically form part of icons shown on a user interface. FIGS. 6 and 13-17 are primarily related to using projections for context visualizations, where the projections typically are formed using opacity maps that are used to overlay a surface presented on the UI. The opacity map is used to modify user interface screen information to create combined data that is presented on a user interface. It is noted that FIG. 4 is directed to a mobile device suitable for both using simulated shadows for context visualizations and for using projections for context visualizations.

The inventors have realized that every icon or other user interface element is substantive, because the icon describes functionality of the application and offers access to the application. For instance, FIG. 2A shows a conventional icon 205 that is typically used for a messaging application. This is a standard messaging application icon. This icon 205 can be thought of as describing functionality of an application, and the inventors have realized that the icon can therefore be thought of as being substantive. However, the "substance" provided by the icon 205 is very limited.

Similarly, the substance may still be very limited when adding other information or characteristics, such as shadows. FIG. 2B shows another conventional icon 206 with a shadow 207 that is typically used for a messaging application. In FIG. 2B, the icon 205 of FIG. 2A now has a shadow 207. With the shadow 207, there no additional substance (e.g., meaning, information) is provided, other than the fact that the icon now appears to be in a space where the icon can cast a shadow.

By contrast, the exemplary embodiments of the disclosed invention are directed to increasing the substance (e.g., information) provided by icons and other user interface elements. FIG. 2C shows an exemplary icon 208 with a shadow 210 providing context visualization herein in an exemplary embodiment for a messaging application. In FIG. 2C, the simulated shadow 210 is now presented as "Granny" text, which indicates that the messaging application has received a message from "Granny" (i.e., grandmother). Thus, additional substance (e.g., information) has been added to the icon 208 as compared with the icons 205, 206 shown in FIGS. 2A and 2B, respectively. The text of "Granny" can be considered to be context information associated with a state of the application that corresponds to the icon 208 in FIG. 2C, which in this case is an email application having a state of a received message.

When adding context information, such as an event corresponding to a state of application that the icon describes, in an exemplary embodiment this may be referred to as an adjective of the user interface element (e.g., icon). In an exemplary embodiment of this invention, the adjective is described in a 3D environment by using shape, texture, shadow, animation, and/or projection, as non-limiting examples.

Using the techniques described herein, one can also design much more intuitive UIs. For example, consider a case where application icons circle the screen and shadows will be cast towards the center of the screen (see FIG. 3). FIG. 3 is an exemplary user interface 300 showing a number of interface elements, some of which have corresponding shadows providing context visualization. The "John" simulated shadow as part of the messaging icon indicates the context information of "I have received a message from John." Note also that the "John" simulated shadow may also indicate the context information of being a friend, and such context information may use, e.g., a color such as green. The "00:32" simulated shadow as part of the calendar icon indicates the context information of "I have a meeting to attend in 32 minutes".

The "+2 CET" simulated shadow as part of the clock icon indicates the context information of "My Time Zone is in Helsinki so it is +2 CET" (central European time). The "324/

350" simulated shadow as part of the imaging icon indicates the context information of "I have taken 324 pictures out of a possible 350". This context information could prompt the user to transfer some of the pictures. The symbol simulated shadow 302, as part of the web icon, indicates the context information of "There is some connection problem in connecting to the Internet". This could prompt the user to determine, e.g., whether the server went down.

Thus, FIG. 3 shows some non-limiting examples of the types of context information that can be provided by simulated shadows formed near (e.g., as part of) an icon. FIG. 3 shows that contextual information can be presented in such a manner to create more vital, context-aware UIs than using traditional UIs. As described in more detail below, an icon may be stored that has the shadow information in properties of the icon. In another exemplary embodiment, the simulated shadow is generated as part of the icon in a "real-time" manner.

FIG. 4 is a block diagram of an exemplary mobile device 400 suitable for presenting user interfaces described herein, including the user interface of FIG. 3. A controller is responsible for the overall operation of the mobile terminal and is typically implemented by any commercially available CPU (Central Processing Unit), DSP (Digital Signal Processor) or any other electronic programmable logic device. The controller is shown in this example as at least one processor (PROC) 401. The at least one processor 401 is associated with at least one memory 402 such as random access memory (RAM), read only memory (ROM), electrically erasable read only memory (EEPROM) memory, magnetic memory, flash memory, or any combination thereof, as non-limiting examples. The memory 402 is used for various purposes by the at least one processor 401, one purpose being for storing data and program instructions for various software in the mobile terminal. The software includes a real-time operating system 420, man-machine interface (MMI) drivers 434, an application handler 432 as well as various applications 460. The applications 460 include a wireless application protocol (WAP) application 460-1, a clock application 460-2, a calendar application 460-3, a messaging application 460-4, and a camera application 460-5.

The MMI drivers 434 cooperate with conventional MMI or input/output (I/O) devices, including a display 436 and a keyboard 438 as well as various other I/O devices such as (not shown) a microphone, a speaker, a vibrator, a joystick, a ring tone generator, and an LED indicator, as non-limiting examples. The display 436 includes a user interface 437, as shown in multiple figures herein. As is commonly known, a user may operate the mobile terminal through the man-machine interface thus formed.

The software also includes various modules, protocol stacks, drivers, etc., which are commonly designated as 430 and which provide communication services (such as transport, network and connectivity) for an RF interface 406, a Bluetooth interface 408 and an IrDA interface 410, as non-limiting examples. The RF interface 406 comprises an internal or external antenna as well as appropriate radio circuitry for establishing and maintaining a wireless link to a base station (e.g., the link 102 and base station 104 in FIG. 1). As is well known to one of ordinary skill in the art, the radio circuitry comprises a series of analogue and digital electronic components, together forming a radio receiver and transmitter. These components include, e.g., band pass filters, amplifiers, mixers, local oscillators, low pass filters, AD/DA converters, etc. The mobile terminal also has a SIM card 404 and an associated reader. As is commonly known, the SIM card 404 generally comprises a processor as well as local work and data memory.

In this example, the operating system 420 also comprises a UI graphics controller 470 and a context visualization rendering module 472. The UI graphics controller 470 acts in combination with the MMI 434 to produce graphics on the display 436 and to therefore draw the UI 437 on the display 436. It is noted that the UI graphics controller 470 could be combined with or placed in the MMI 434. In an exemplary embodiment, the context visualization rendering module 472 has access to the UI screen information 473 and the shading map information 474 (e.g., stored in memory/memories 402).

Referring also to FIG. 3, associated with each application 460 is corresponding context visualization information 465. Each context visualization information 465 includes in this example context information 480, an application state 481, and UI element information 483. In each of these exemplary cases, the UI element information 483 comprises icon data 485. The application state 481 is a state of the application 460 for which there is associated context information 480. The application states "Connection problem (icon only)" 481-1, "CET indication on" 481-2, "Timer activated" 481-3, "Message received (RCVD)" 481-4, and "Picture count enables" 481-5 correspond to the context information 480 of (respectively) "Connection has expired" 480-1, "+2 CET" 480-2, "00:32" 480-3, "John" 480-4, and "324/350" 480-5.

In certain of the cases, the UI element information 483 also comprises a shading map icon attribute 487. The icon data 485 is the image data (such as a bitmap) of the icon to which the application 460 is associated. For instance, the WAP (Wireless Application Protocol) application 460-1 is associated with the icon data 485-1 corresponding to the web icon (and the corresponding text of Web) shown in FIG. 3. The clock application 460-2 is associated with the icon data 485-2 corresponding to the clock icon (and the corresponding text of clock) shown in FIG. 3. The calendar application 460-3 is associated with the icon data 485-3 corresponding to the calendar icon (and the corresponding text of Calendar) shown in FIG. 3. The messaging application 460-4 is associated with the icon data 485-4 corresponding to the envelope icon (and the corresponding text of Messaging) shown in FIG. 3. The camera application 460-5 is associated with the icon data 485-5 corresponding to the imaging icon (and the corresponding text of Imaging) shown in FIG. 3.

With regard to the context visualization information 465-2 for the clock application 460-2, the shading map icon attribute 487-2 provides shading map information to produce the simulated shadow of "+2 CET". Similarly, in the context visualization information 465-4 for the messaging application 460-4, the shading map icon attribute 487-4 provides shading map information to produce the simulated shadow of "John". Also, another context information 480 of "Friend" is included in context visualization information 465-4, which indicates that "John" is a "friend". The "friend" context information 480-6 causes the attribute 488-4 of "green" to be applied to the shading map icon attribute 487. Therefore, in FIG. 3, the simulated shadow of "John" will be the color "green". The context visualization information 465-2 and 465-4 are "fixed" and therefore the corresponding shading map icon attribute 487-2 and 487-5 can be implemented as an icon attribute.

By contrast, the context visualization information 465-3 and 465-5 do not have a shading map icon attribute 487 associated with them. This is because the context information 4803 and 480-5 change depending on time and picture count (respectively), so a simulated shadow for these applications 460-3 and 460-5 is created (e.g., by the context visualization rendering module 472) in real-time. The shading map 474 is created and applied to the user interface to create the simulated shadows "00:32" and "324/350" in FIG. 3.

With regard to context visualization information 465-1, there is a separate shading map 489-1, which is a shading map to create the simulated shadow 302 shown in FIG. 3. The context information 480-1 is represented in this instance by the shading map 489-1 and the corresponding simulated shadow 302.

In another exemplary embodiment, an opacity map 415 is applied to the UI screen information 473 in order to provide a projection on a surface presented in the UI 437. This is explained in greater detail below.

It is noted that the mobile device 400 is merely one example of a device for which the exemplary embodiments of the disclosed invention are applicable. Other devices may have different items therein.

Figure 5:
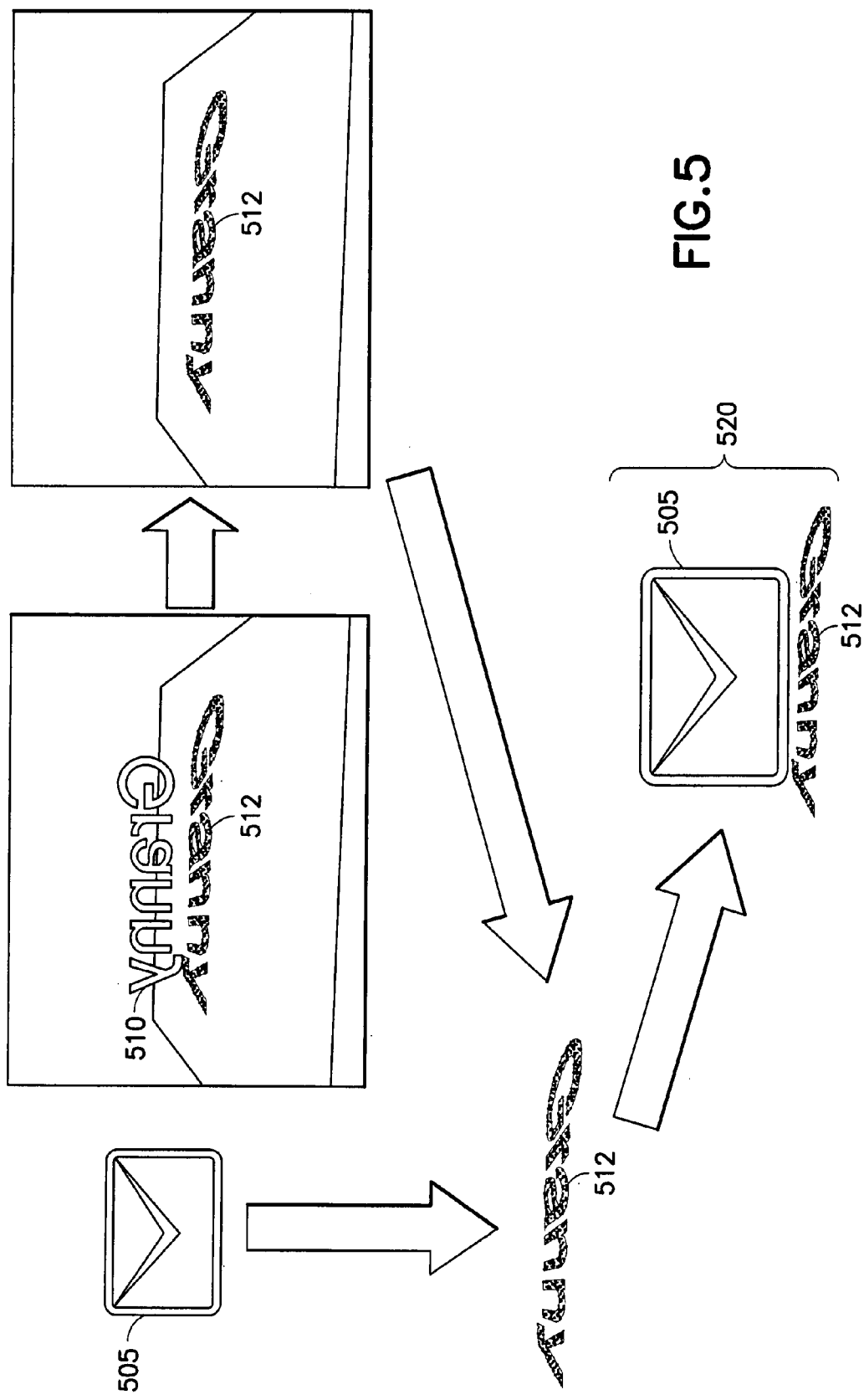
FIG. 5 is an example showing how a CROS (Context Reference Object Shadow) might be created.

One example of an icon is an object in a 3D space. The icon's shape, texture and color can be changed with, e.g., 3D scripting language (e.g., code). When lighting and texture properties like shading maps will be added, the object gains shadow(s) and projection(s). In an exemplary embodiment of this invention, shading maps and shadows of the object will not be the same as the original object would naturally cast. Instead, there will be separate Contextual Reference Objects (CROs) that will be used to show simulated shadows of icons. Such a shadow (e.g., a simulated shadow) can be called a CROS (Contextual Reference Object Shadow). As shown in FIG. 5, when a UI is rendered, the application icon 505 will be rendered normally but the application icon 505 will not cast any shadow at all. The CRO 510 that matches with context information 480 (in this case, "Granny") in question (which is associated with the state 481 of the application) will not be drawn but its shadow 512 will be drawn. Note that the CRO is a 3D version of the context information 481 of "Granny". Only the CROS (e.g., simulated shadow) 512 is visible after rendering using the CRO. It is noted that the end result could be one icon 520 or an icon 505 plus a simulated shadow 512.

In the end, one has a UI element (e.g., an application icon) on the display and there will be a simulated shadow (e.g., a CROS) that indicates a state associated with the application 460, but the shadow 512 comes from a CRO 510. When a user looks at the icon 520, the user sees the shadow 512 which corresponds to the application state. CRO shadows 512 (CROS) may be used with any existing UI form. The simulated shadow 512 changes the look and feel only a minimal amount and offers an easy way to show context information 481 without using any separate context awareness applications. Typically, context information (such as metadata changes) for applications is presented with complex lists, and the techniques provided herein dramatically simplify this.

An implementation example is to use shadows on an invisible surface that can circle the icon where CROS is added. This invisible surface is not rendered but the shadow area is rendered showing where the shadow is cast. This is generally a more complex process than, e.g., creating a complete icon having a shadow incorporated therein, but may also be useful in many 3D products, such as for applications relating to games and movies, as non-limiting examples. This technique provides the ability to perform all of the examples that are presented in FIG. 7. FIG. 7, including FIGS. 7A-7G, and FIG. 8, including FIGS. 8A and 8B, show various embodiments for providing context visualization associated with an icon.

In FIGS. 7A, 7B, 7F, and 7G, color indicates in this case how full the trash can is. Green (FIG. 7A) is quite empty while red (FIG. 7B) is quite full. In FIG. 7C, a beer glass 710 indicates that pictures from last night's bar hop are now in the trash. The beer glass 710 is a personalized metadata symbol for photographs. FIGS. 7D and 7E use the projection direction and shadow to indicate time. Sun light comes from different direction at different times of the day.

In FIGS. 8A and 8B, the shape of the shadow can indicate how large a file is or how big a folder is. FIG. 8A shows a larger file/folder, while FIG. 8B shows a smaller file/folder.

FIG. 9 shows an example of modification of a shadow to provide multiple context visualizations. A blur effect can indicate, e.g., how old the received message, phone call or other event was. The blur effect can also indicate importance if calls are rated. It is noted that the blur effect can be applied to simulated shadows or to projections (as described below).

Figure 10:
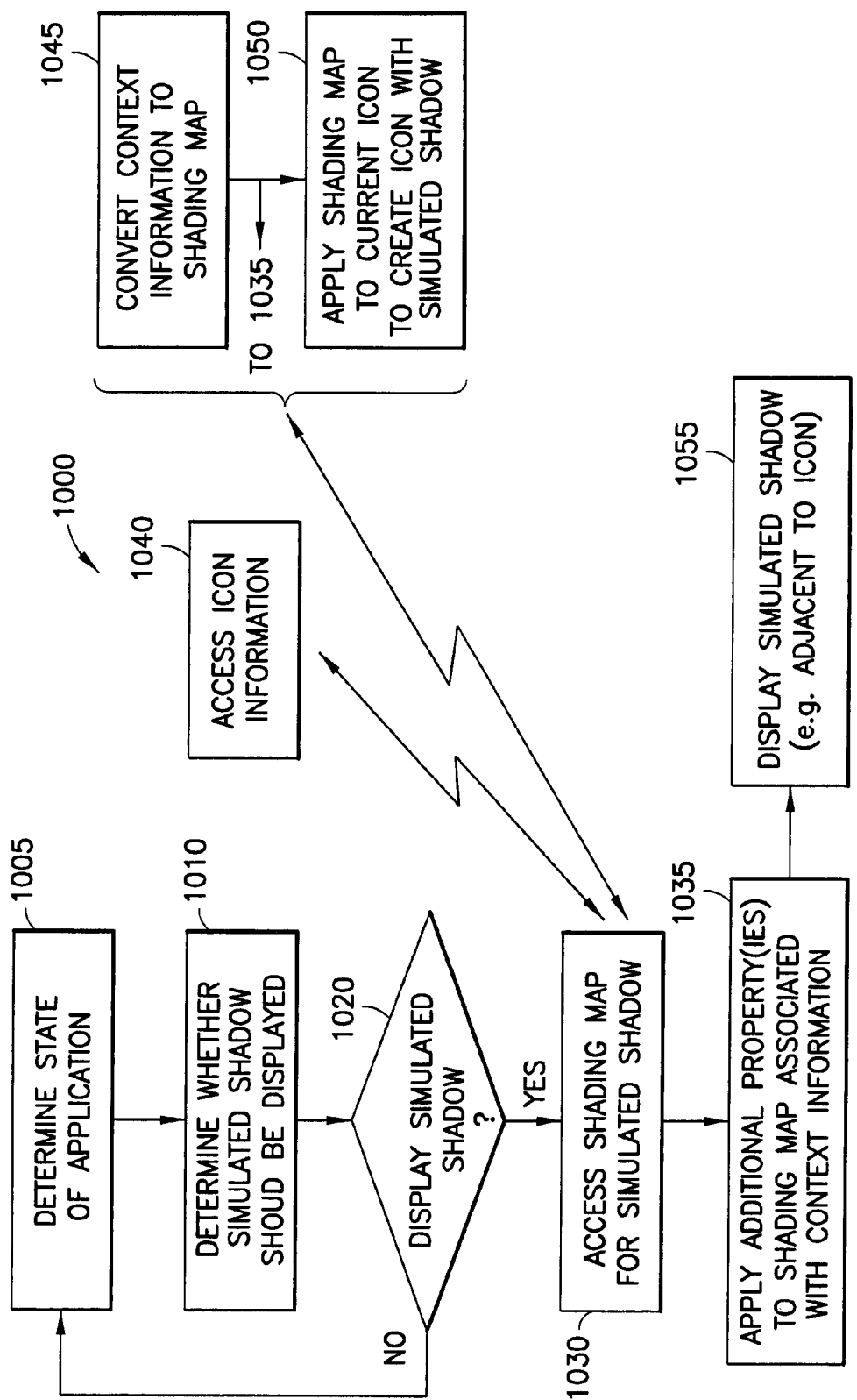
FIG. 10 is a flowchart of an exemplary method for providing context visualization for interface elements such as icons corresponding to applications.

FIG. 10 is a flowchart of an exemplary method for providing context visualization for interface elements such as icons corresponding to applications. Method 1000 would be performed, e.g., by the one or more processors 401 using instructions in context visualization rendering module 472 for instance. In block 1005, the state (e.g., application state 481) of an application 460 is determined. In block 1010, it is determined, based on the state, whether a simulated shadow (e.g., CROS) should be displayed. If not (block 1020=NO), the method 1000 returns to block 1005 (e.g., to await a state change for the application 460). If so (block 1020=YES), a shading map corresponding to the state and to the simulated shadow is accessed (block 1030).

Block 1030 may be performed in a number of ways. In block 1040, icon information is accessed, wherein the icon information (e.g., UI element information 483) includes both an icon (e.g., icon data 485) and a shading map (e.g., shading map 487). As another option, in block 1045, context information 480 is converted to a shading map (e.g., as shown using the CRO shown in FIG. 5). After block 1045, operation could return to block 1035, for situations where just the shading map is needed. In block 1050, the shading map is applied to the current icon to create an icon with the shadow map. Block 1050 is directed to those situations where an entire icon is to be created that includes both icon data and simulated shadow data.

In block 1035, additional properties are applied to a shading map. For instance, the "green" attribute 488-4 of FIG. 4 (see context visualization information 465-4) could be applied in block 1035. Other properties, such as a blur effect (FIG. 9) or flashing, may be applied.

The simulated shadow is displayed in block 1055. In those implementations where the simulated shadow itself is displayed using a shading map, the simulated shadow is displayed typically adjacent to an icon. In those situations where a "new" icon is accessed or created that has both the simulated shadow and the "old" icon (e.g., blocks 1040 and 1050), the new icon is displayed on the UI 437.

There are a number of different implementation possibilities. One possibility (as indicated by many of the simulated shadow and CROS above) is to use a simulated shadow as a shadow would behave in physical reality. The icon that casts the shadow has its shadow on one side of the icon, depending of course on the height and intensity of light in a 3D space. If a light source is high in position towards the icon, the shadow is small. But if a light source is nearly same level as the horizon, the shadow is long. Also, the icon can be above the "ground" so then its shadow is away from the icon depending how far above the theoretical ground the icon is. A shadow is cast always to some surface, either theoretical ground or on other icon or other UI element. As referred to herein, theoretical ground indicates the surface upon which the shadow is cast. In most cases, this surface will not be rendered. This surface can exist either alone with the icon (i.e., without any relation to other surfaces) or the surface can form a unified ground with all icons. If the former technique is used, every CRO can have shadows that behave in a unique way. This of course requires unique light sources, too, that will exclude all other icons not affected by this light. Another way to do this is that there is one common surface then all shadows behave in a similar way.

In addition to this implementation of CROS, is another implementation where an icon or other UI element can have multiple shadows. With multiple different shadows, one can indicate different things like, for example, missed calls or received messages, as described below in reference to FIGS. 11 and 12. This can be made either with a light source(s) that affects different CROS in relation with each other. Like soccer players that have multiple shadows when they are playing soccer in big stadium. Or each light source excludes other CRO and only shadows will be drawn for the affected CRO. This allows one to use CROS much more efficiently and one would therefore not be tied to the limitations of the physical world.

Figure 11:
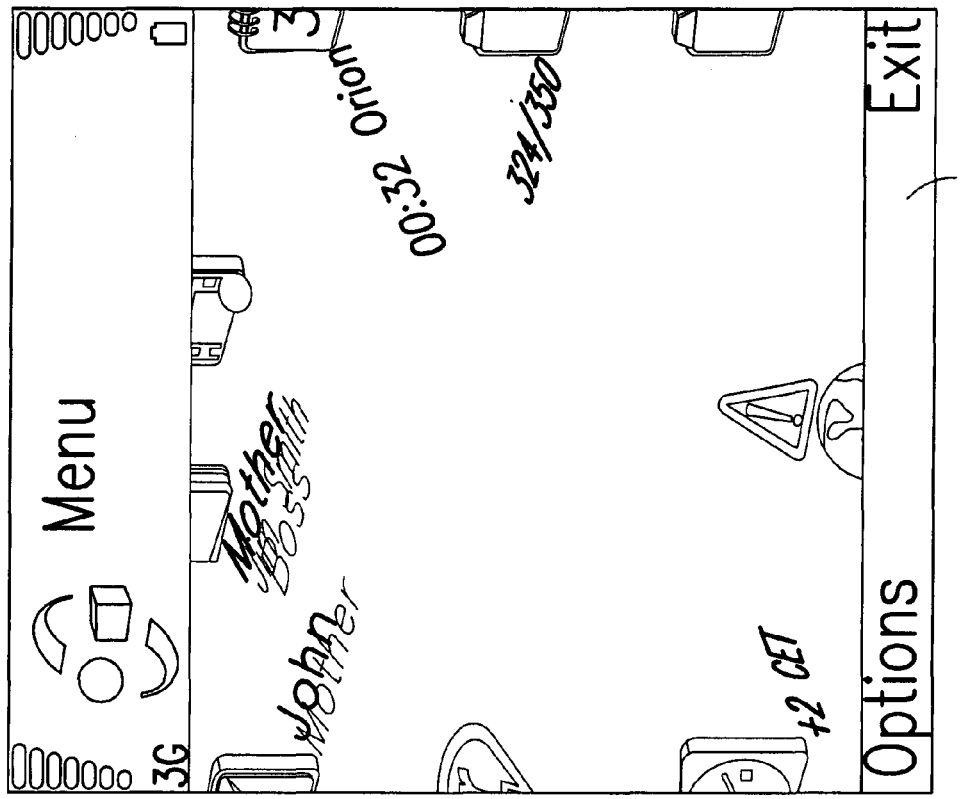
FIGS. 11 and 12 are possible use scenarios for context visualizations using shadows.
Figure 12:
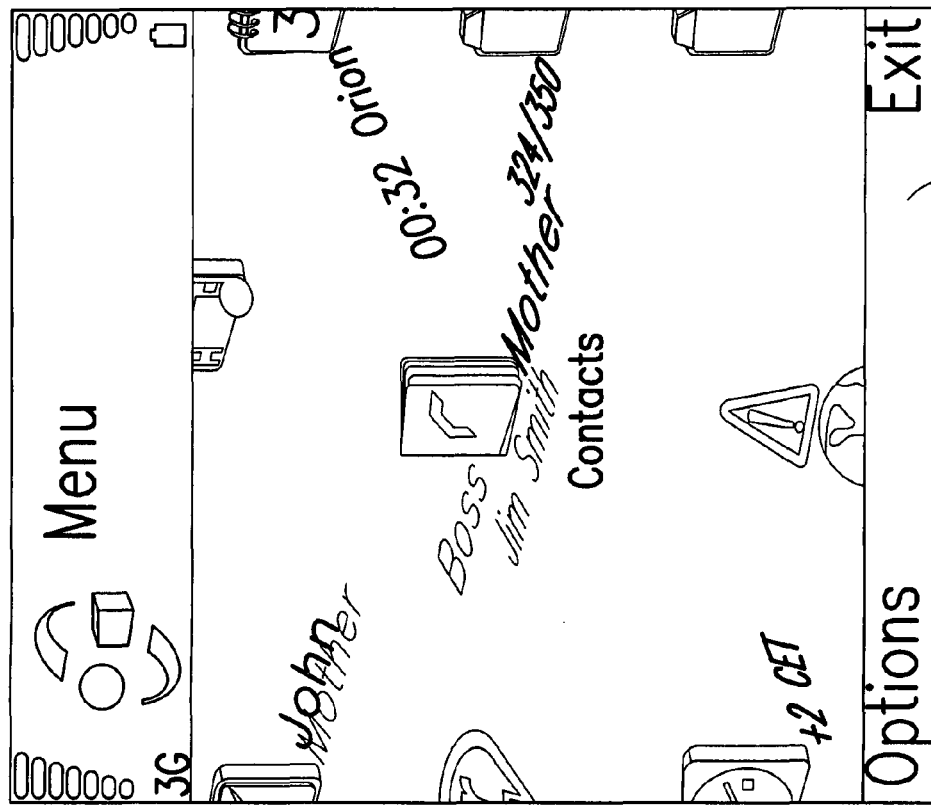

FIGS. 11 and 12 are possible use scenarios using context visualizations using shadows. FIG. 11 shows when the mobile device 400 is not actively being used, all the icons are on sides of the display 436 (and therefore the UI 437). All simulated shadows (e.g., CROS) are visible. Furthermore, a user receives information about contexts easily. FIG. 12 shows what can happened when the user selects an application. The selected application moves to the center of the display 436 and the user sees all related simulated shadows (e.g., CROS) around that icon. In this example, the simulated shadows are "Mother", "Jim Smith", and "Boss".

The preceding description mainly concerns exemplary implementations where a shadow is associated with an icon. In other exemplary implementations, a projection is used that is not necessarily associated with an icon and is instead displayed on a surface presented in the user interface.

Figure 6:
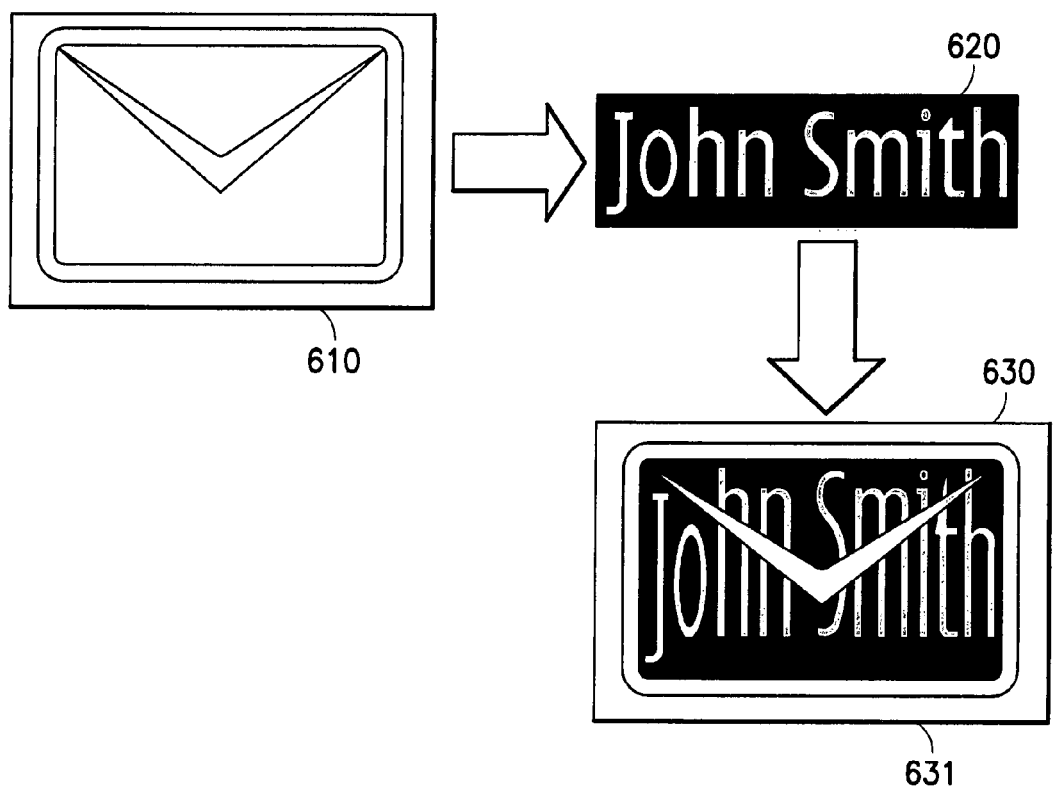
FIG. 6 is an example showing how a shadow mask might be incorporated into an icon to provide context visualization.

Turning to FIG. 6, for instance, a standard messaging icon 610 is shown. A projection, called a Context Reference Object Projection (CROP) has information 620 that is added on, e.g., a projection shader channel. All that is black in information 620 (typically, implemented using an opacity map 415) is generally thought to be transparent in 3D environments. The icon 610 and information 620 are combined to create the combination 630. Note that the projection illustrated by information 620 can be considered to be displayed on a surface that includes the icon 610. Now CROP is added to the surface 631 of the icon 630 and without any additional processing the end result is shown as the combination 630.

Figure 13:
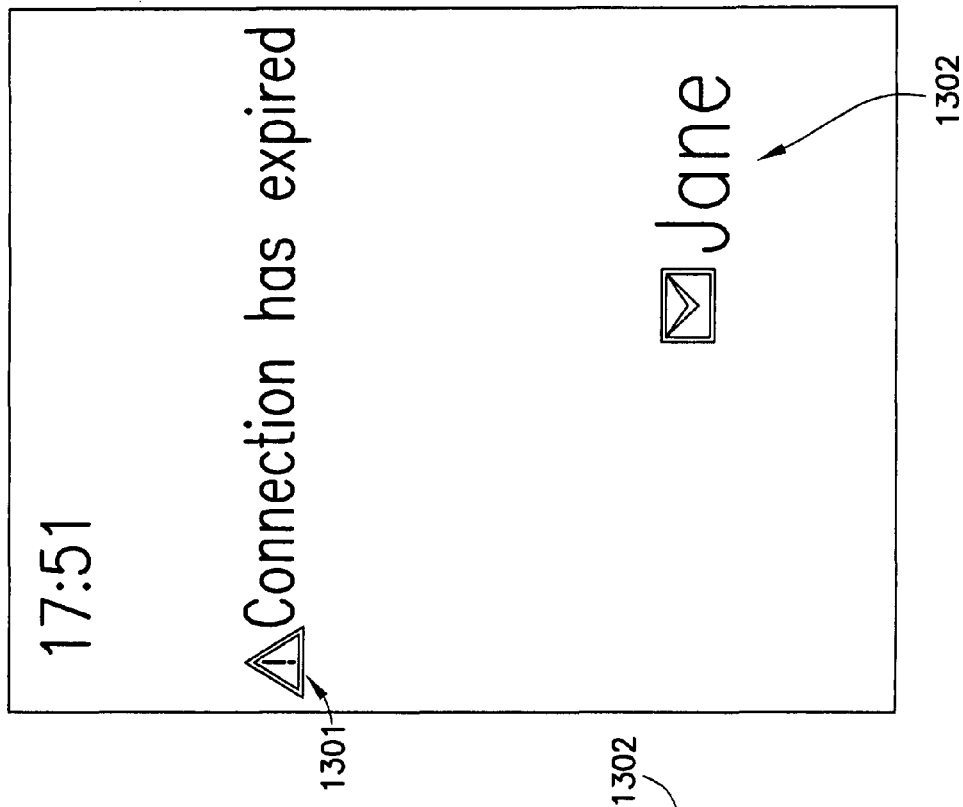
FIG. 13 shows a user interface having display information formed by a combination of user interface screen information and projections having an opacity map associated with context information.
Figure 14:
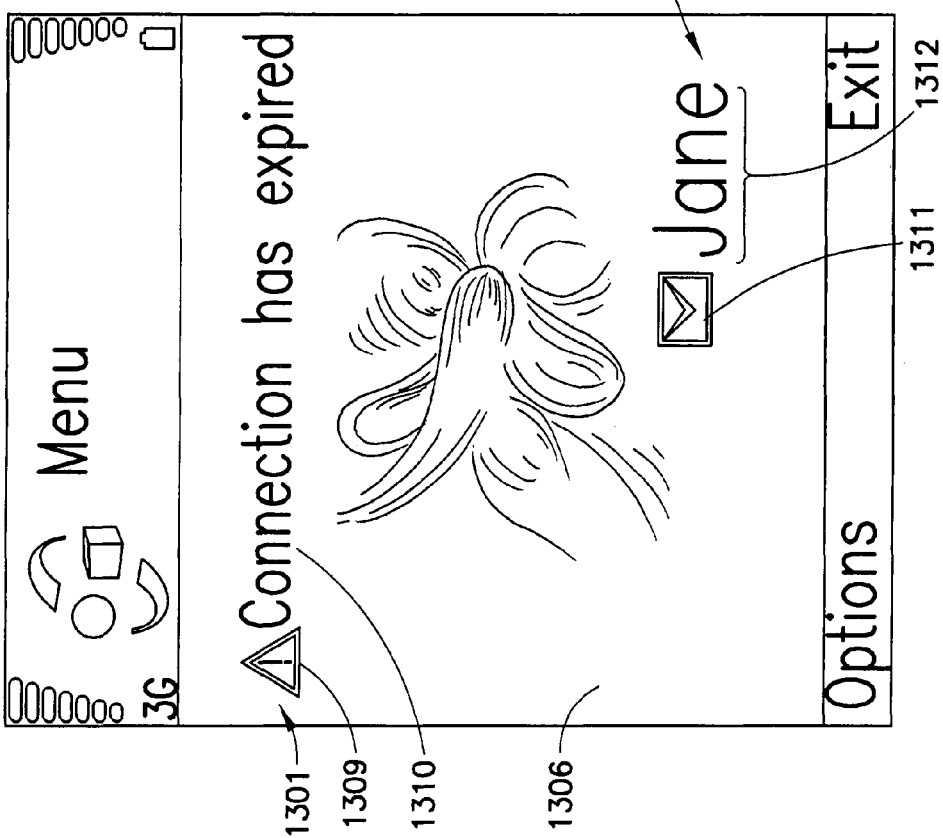
FIG. 14 shows an example where a screen saver is used to convey the projections.

FIG. 13 shows a user interface having display information formed by a combination of user interface screen information and projections having opacity maps associated with context information. Here the projections (e.g., CROP) 1301, 1302 of text 1310 "Connection has expired" and an icon 1301 and the text 1312 of "Jane" and an icon 1311 are cast on the background image 1306 while a mobile device 400 is in an idle screen state. The projections include (e.g., as text 1310 and 1302 and perhaps icon 1309) indications of the contextual information 480. Indicating contextual information 480 and associated states of applications 460 in this way does not break the user defined theme. FIG. 14 shows an example where a screen saver is used to convey the projections. An idea in FIG. 14 is that the projections (e.g., CROP) 1301 and 1302 move and bounce around the screen.

Figure 16:
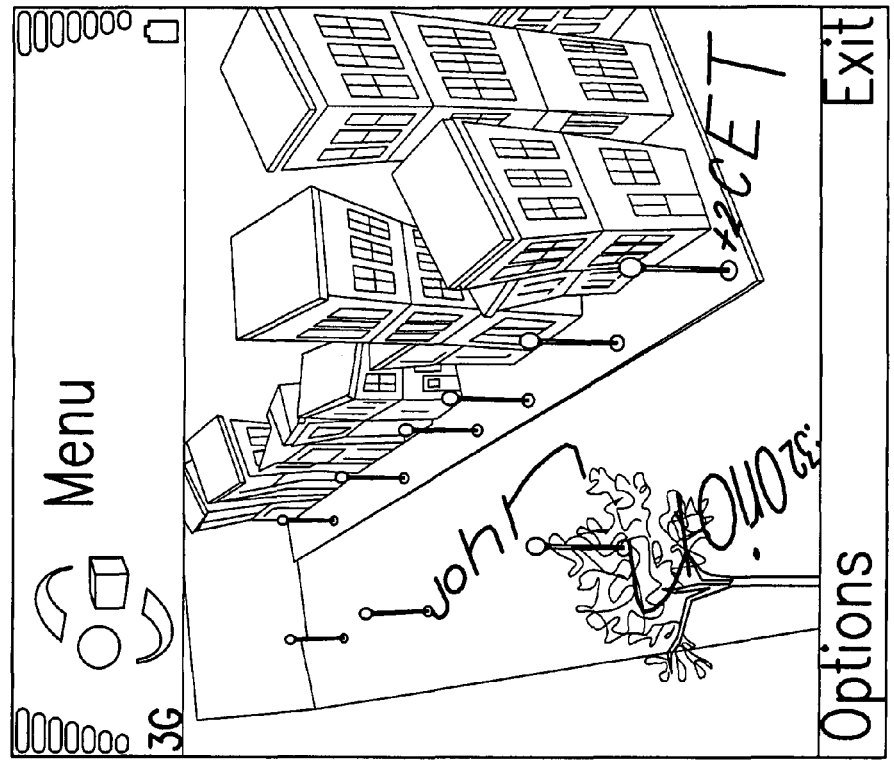
FIGS. 15 and 16 are examples where there are no icons.
Figure 15:
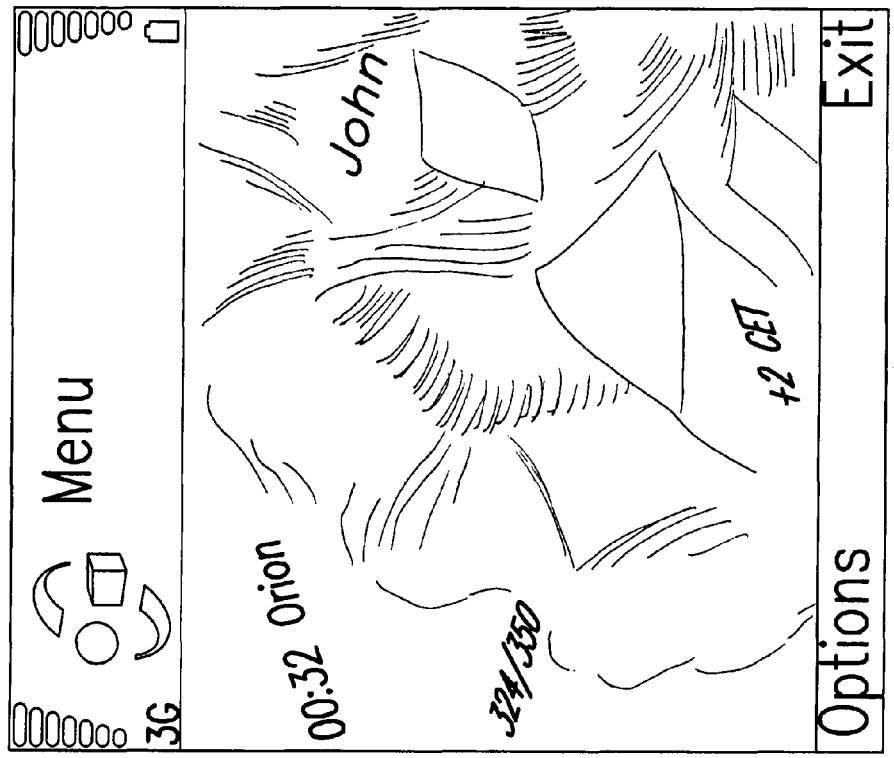

Another implementation technique for projections (e.g., CROP) is that only projections will be drawn and there will be no icons at all. FIGS. 15 and 16 are examples where no icons are used. CROP can be used also without any icons. Icons will not be drawn at all, and only the projections ("00:32 Orion", "324/350", "John", and "+2 CET") will be drawn. This gives a user more space for other items, such as images. It is noted that a "projection" can be a simulated shadow created for an icon even where the icon itself is not shown.

Figure 17:
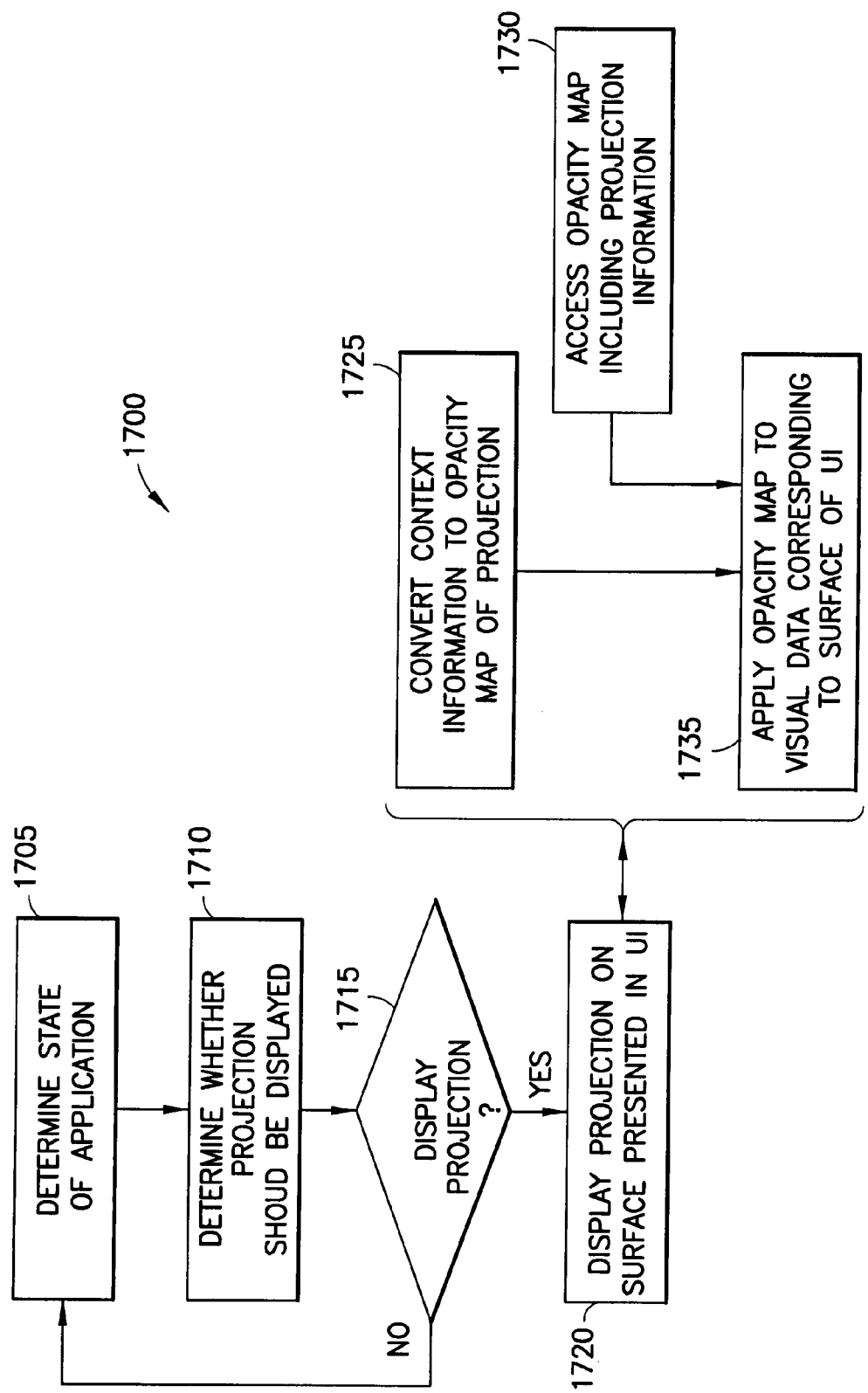
FIG. 17 is a flowchart of an exemplary method for providing context visualization for projections having information corresponding to applications.

FIG. 17 is a flowchart of an exemplary method for providing context visualization for interface elements such as icons corresponding to applications. Method 1700 would be performed, e.g., by data processor 401 of the mobile device 400, under control, e.g., of context visualization rendering module 472. In block 1705, the state (e.g., state 481) of an application 460 is determined. In block 1710, it is determined, using the state, whether a projection should be displayed. If the projection should not be displayed (block 1715=NO), the method 1700 continues in block 1705 (e.g., where the method 1700 waits for a state change). If the projection should be displayed (block 1715=YES), the projection is displayed on a surface presented in the UI in block 1720.

Block 1720 may be implemented through a number of techniques. For instance, in block 1725, the context information is converted to an opacity map of the projection. As another option, in block 1730, an opacity map is accessed, where the accessed opacity map includes projection information to create the projection. Blocks 1725 and 1730 may return to block 1720 if the opacity map will be applied directly to UI screen information 473. In block 1735, the opacity map is applied to visual data corresponding to the surface of the UI at which the projection is to be presented. Block 1735 allows information to be modified prior to sending the modified information to the UI screen information 473 to modify the UI 437 on the display 436.

The embodiments of this invention may be implemented by computer software executable by a data processor of the mobile device 400, such as the processor 401, or by hardware, or by a combination of software and hardware. Further in this regard it should be noted that the various blocks of the logic flow diagram of FIGS. 10 and 17 might represent program steps, or interconnected logic circuits, blocks and functions, or a combination of program steps and logic circuits, blocks and functions.

The memory 402 may be of any type suitable to the local technical environment and may be implemented using any suitable data storage technology, such as semiconductor-based memory devices, magnetic memory devices and systems, optical memory devices and systems, fixed memory and removable memory. The data processor 401 may be of any type suitable to the local technical environment, and may include one or more of general purpose computers, special purpose circuits, microprocessors, digital signal processors (DSPs) and processors based on a multi-core processor architecture, as non-limiting examples.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

Although described above primarily within the framework of displaying contextual information for an application, the exemplary embodiments of the invention are not limited only to applications. As a non-limiting example, the exemplary embodiments of the invention may be utilized to display contextual information for a document, such as a word processing file or spreadsheet, as non-limiting examples. As another non-limiting example, the exemplary embodiments of the invention may be utilized to display file information. For example, the data a document was last modified may be indicated in a simulated shadow of or projected on a UI element (e.g., an icon) corresponding to the document.

Furthermore, although described above, and illustrated in FIGS. 13-17 as projecting contextual information on or over a UI element (e.g., an icon) or surface, the contextual information may also be projected under (e.g., beneath) the UI element. That is, the term projection is not limited to projecting information onto or above a UI element or surface. Information may be projected from below or behind a UI element or surface. As a non-limiting example, layers could be employed such that a lower layer comprising the contextual information is shown beneath a UI element that is at least partially transparent. As another non-limiting example, contextual information could be projected onto the underside of a UI element or surface such that the contextual information is visible through a transparent portion of the UI element or surface.

In general, the various embodiments may be implemented in hardware (e.g., special purpose circuits, and logic), software, or any combination thereof. For example, some aspects may be implemented in hardware, while other aspects may be implemented in software which may be executed by a hardware such as a controller, microprocessor or other computing device, although the invention is not limited thereto. Exemplary embodiments of the disclosed invention may be implemented as a computer program product that embodies a program of machine-readable instructions executable by at least one data processor to perform operations described herein.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A method comprising:
   displaying an icon associated with an application or file on a display;
   displaying, on the display, in association with the icon a simulated shadow comprising contextual information associated with the application or file, wherein the contextual information comprises a state of the application or file; and
   in response to the state of the application or file changing to a new state, displaying in association with the icon a new simulated shadow corresponding to the new state.

2. The method of claim 1, wherein the simulated shadow comprises a first simulated shadow, wherein the first simulated shadow comprises a shape and a color, wherein the new simulated shadow comprises at least one of a different shape or a different color as compared to the first simulated shadow.

3. The method of claim 1, wherein the displayed icon comprises a three dimensional icon or an object in a three dimensional space.

4. The method of claim 1, wherein the contextual information is indicated by an indicating attribute of the simulated shadow, wherein the indicating attribute comprises at least one of a shape, a color, a texture, a blur effect, lighting, text or a graphic.

5. The method of claim 1, wherein the contextual information comprises variable contextual information, the method further comprising:
   generating the simulated shadow based on the variable contextual information.

6. The method of claim 5, wherein generating the simulated shadow comprises creating a shading map, wherein displaying the simulated shadow comprises applying the shading map.

7. The method of claim 5, further comprising:
   in response to the variable contextual information changing to new variable contextual information, generating a new simulated shadow based on the new variable contextual information; and
   displaying in association with the icon the new simulated shadow.

8. The method of claim 1, wherein displaying the simulated shadow comprises at least one of applying a shading map or applying an opacity map.

9. The method of claim 1, wherein the icon comprises a first icon, wherein the simulated shadow comprises a first simulated shadow, wherein the application or file comprises a first application or file, wherein the contextual information comprises first contextual information, the method further comprising:
   displaying a second icon associated with a second application or file; and
   displaying in association with the second icon a second simulated shadow comprising second contextual information associated with the second application or file, wherein the second simulated shadow is independent of the first simulated shadow.

10. The method of claim 1, wherein the icon comprises a first icon, wherein the simulated shadow comprises a first simulated shadow, wherein the application or file comprises a first application or file, wherein the contextual information comprises first contextual information, the method further comprising:
    displaying a second icon associated with a second application or file; and
    displaying in association with the second icon a second simulated shadow comprising second contextual information associated with the second application or file, wherein the second simulated shadow is connected to the first simulated shadow.

11. The method of claim 1, wherein the icon and the simulated shadow are displayed in a user interface of a mobile electronic device.

12. The method of claim 1, wherein the contextual information comprises metadata information.

13. A computer program product comprising program instructions embodied on a non-transitory computer-readable medium, execution of the program instructions resulting in operations comprising:
 enabling display of an icon associated with an application or file on a display;
 enabling display, on the display in association with the icon, of a simulated shadow comprising contextual information associated with the application or file, wherein the contextual information comprises a state of the application or file; and
 in response to the state of the application or file changing to a new state, displaying in association with the icon a new simulated shadow corresponding to the new state.

14. The computer program product of claim 13, wherein the contextual information is indicated by an indicating attribute of the simulated shadow, wherein the indicating attribute comprises at least one of a shape, a color, a texture, a blur effect, lighting, text or a graphic.

15. The computer program product of claim 13, wherein the contextual information comprises variable contextual information, the method further comprising:
 generating the simulated shadow based on the variable contextual information.

16. The computer program product of claim 13, wherein displaying the simulated shadow comprises at least one of applying a shading map or applying an opacity map.

17. The computer program product of claim 13, wherein the icon and the simulated shadow are displayed in a user interface of a mobile electronic device.

18. The computer program product of claim 13, wherein the contextual information comprises metadata information.

19. An apparatus comprising:
 at least one data processor; and
 at least one memory including computer program code
 the at least on memory and the computer program code configured to, with the at least one processor, cause the apparatus to perform at least the following:
 enable display, on a display device of an electronic device, of an icon associated with an application or file; and
 enable display, on the display device, in association with the icon of a simulated shadow comprising contextual information associated with the application or file, wherein the contextual information comprises a state of the application or file; and
 in response to the state of the application or changing to a new state, display on the display device in association with the icon a new simulated shadow corresponding to the new state.

20. The apparatus of claim 19, wherein the contextual information is indicated by an indicating attribute of the simulated shadow, wherein the indicating attribute comprises at least one of a shape, a color, a texture, a blur effect, lighting, text or a graphic.

21. The apparatus of claim 19, wherein the contextual information comprises variable contextual information, wherein the data processor is further configured to: generate the simulated shadow based on the variable contextual information.

22. The apparatus of claim 19, further comprising:
 a memory coupled to the data processor, wherein the memory is configured to store at least one of a shading map and an opacity map, wherein the data processor is further configured to perform at least one of: applying the shading map or applying the opacity map.

23. The apparatus of claim 19, further comprising:
 a transceiver coupled to the data processor; and
 at least one antenna coupled to the transceiver.

24. The apparatus of claim 23, wherein the apparatus comprises the electronic device or wherein the electronic device is a mobile electronic device having a display device.

25. The apparatus of claim 24, wherein the mobile electronic device comprises a mobile phone.

26. The electronic device of claim 19, wherein the contextual information comprises metadata information.

27. A method comprising:
 displaying a user interface element associated with an application or file on a display; and
 projecting a simulated image onto the user interface element on the display, wherein the projected simulated image comprises contextual information associated with the application or file, wherein the contextual information comprises metadata information.

28. The method of claim 27, further comprising:
 determining whether the projected simulated image should be displayed, wherein the projecting of the simulated image is performed in response to determining that the projected simulated image should be displayed.

29. The method of claim 27, wherein the contextual information comprises variable contextual information, the method further comprising:
 generating the simulated image based on the variable contextual information.

30. The method of claim 27, wherein projecting the simulated image comprises at least one of applying a shading map or applying an opacity map.

31. The method of claim 27, wherein the user interface element comprises a portion that is at least partially transparent, wherein projecting the simulated image comprises projecting the simulated image on a back of the user interface element such that the contextual information is visible to a user through the portion that is at least partially transparent.

32. An apparatus comprising:
 at least one processor; and
 at least one memory including computer program code
 the at least one memory and the computer program code configured to, with the at least one processor, cause the apparatus to perform at least the following:
 enable display of a user interface element associated with an application or file on a display; and
 enable projection of a simulated image onto the user interface element on the display, wherein the projected simulated image comprises contextual information associated with the application or file, wherein the contextual information comprises metadata information.

33. A computer program product comprising program instructions embodied on a non-transitory computer-readable medium, execution of the program instructions resulting in operations comprising:
 enabling display of a user interface element associated with an application or file on a display; and
 enabling projection of a simulated image onto the user interface element on the display, wherein the projected simulated image comprises contextual information associated with the application or file, wherein the contextual information comprises metadata information.

* * * * *

UNITED STATES PATENT AND TRADEMARK OFFICE
CERTIFICATE OF CORRECTION

| | | |
|---|---|---|
| PATENT NO. | : 8,713,458 B2 | Page 1 of 1 |
| APPLICATION NO. | : 11/706779 | |
| DATED | : April 29, 2014 | |
| INVENTOR(S) | : Mattila et al. | |

It is certified that error appears in the above-identified patent and that said Letters Patent is hereby corrected as shown below:

In the Claims

Claim 19, col. 13, line 54 insert --file-- inbetween "or" and "changing".

Signed and Sealed this
Twenty-ninth Day of July, 2014

Michelle K. Lee
*Deputy Director of the United States Patent and Trademark Office*